United States Patent
Seargeant

[19]

[11] Patent Number: 5,823,605
[45] Date of Patent: Oct. 20, 1998

[54] TRUCK BOX COVER

[76] Inventor: Dennis Harold Seargeant, 88 Carl Avenue, Thunder Bay, Ontario, Canada, P7B 4Z5

[21] Appl. No.: 738,791

[22] Filed: Oct. 29, 1996

[51] Int. Cl.$^6$ ................................................ B60P 7/02
[52] U.S. Cl. ...................... 296/100.09; 296/32; 296/219; 160/36; 160/201; 220/345
[58] Field of Search .................................... 296/100, 101, 296/219, 32; 160/35–37, 84.01, 201, 206; 220/345, 350

[56] References Cited

U.S. PATENT DOCUMENTS

| | | | |
|---|---|---|---|
| 2,014,140 | 9/1935 | Larsen . | |
| 3,675,967 | 7/1972 | Ahrens . | |
| 4,547,014 | 10/1985 | Wicker | 296/100 |
| 4,717,196 | 1/1988 | Adams | 296/98 |
| 4,789,196 | 12/1988 | Fields | 296/100 |
| 4,867,220 | 9/1989 | Matsumoto et al. | 296/219 X |
| 5,203,603 | 4/1993 | Hertzberg et al. | 296/100 |
| 5,316,357 | 5/1994 | Schroeder | 296/100 X |
| 5,516,182 | 5/1996 | Aragon et al. | 296/100 |

*Primary Examiner*—Dennis H. Pedder
*Attorney, Agent, or Firm*—Adrian D. Battison; Murray E. Thrift

[57] ABSTRACT

A cover system for the truck box of a pickup truck includes upstanding sides and front portion which define inwardly thereof an open area to be covered by a series of parallel edge to edge cover panels. The cover panels slide forwardly and rearwardly on a guide track and the guide track is divided at the front so that the panels form accordion folds in a fold section stored at the front of the structure. Two rear side parts at the rear of the cover can be pivoted about a a horizontal axis across the top. These rear portions carry a part of the guide track and a whole number of panels fill the area from the hinge to the bottom edge of the rear portion. Thus the rear portion can be pivoted about the hinge while the panels flex. Thus only a rear portion can be opened or the cover panels can be moved forwardly to various set locations or folded fully.

20 Claims, 5 Drawing Sheets

TRUCK BOX COVER

BACKGROUND OF THE INVENTION

This invention relates to folding a cover for a container which is particularly but not exclusively designed for use with a truck box of a type which includes a top which can be opened by a sliding action to allow transportation of articles in the truck box which are higher than the top of the cover.

Many previous designs have been proposed for covers for a truck box which can allow a sliding action for ready opening of the cover. Examples are shown in U.S. Pat. Nos. 2,014,140 (Larson), 3,675,967 (Ahrens), 4,789,196 (Fields), 5,203,603 (Hertzberg) and 5,516,182 (Aragon). All of these show covers which slide forwardly. In some cases the whole cover slides in a single element. In other cases, particularly Fields, Aragon and Hertzberg, the cover is formed in sections which slide forwardly so that the sections telescope one inside the next.

Such devices are relatively inconvenient and difficult to manufacture since the whole cover portion must slide inside the next cover portion.

SUMMARY OF THE INVENTION

It is one object of the present invention to provide an improved cover which allows a simplified sliding action and which only a top portion of the cover slides to the open position.

According to one aspect of the invention there is provided a folding cover for a container comprising:

a cover body having a front cover element for connection to a front wall of the container and two side cover elements each for connection to a respective one of two side walls of the container, the front and side cover elements defining an open top;

and a cover top for extending across and covering the open top, the cover top comprising:

a plurality of cover panels each having two side edges, a front edge and a rear edge and each extending across the open top such that each side edge lies at a respective one of the side cover elements;

the cover panels being arranged in a row with the front edge of one panel adjacent the rear edge of the next panel with the row extending from a forward most panel to a rearward most panel;

a flexible hinged coupling between each panel and the next adjacent panel connecting the front edge of one panel to the rear edge of the next adjacent panel;

each side cover element having thereon a guide track cooperating with the respective side edges of the panels to allow sliding movement of the panels forwardly and rearwardly of the cover body;

the guide tracks being arranged such that, as the panels are moved forwardly, a rear edge of a first panel and connected front edge of a second panel are folded downwardly while a rear edge of the second panel and the connected front edge of a third panel are folded upwardly so that the panels are folded in accordion manner at a forward end of the container.

Preferably each guide track has a main track portion along the side cover elements, a first guide track portion for guiding the upwardly folded edges and a second guide track portion for guiding the downwardly folded edges.

Preferably the first guide track portion lies along a common line with the main track portion such that the upwardly folded edges lie in a common plane with a remainder of the cover panels and the second guide track portion extends downwardly from the first guide track portion.

Preferably at least one of the rear edge of the first panel and the front edge of the second panel carries a first projecting roller for engaging the first guide track portion and at least one of the rear edge of the second panel and the front edge of the third panel carries a second projecting roller for engaging the second guide track portion, the main track portion being shaped in cross-section to receive both the first and second projecting rollers, the first guide track portion being shaped in cross-section to receive only the second projecting roller and the second guide track portion being shaped to receive only the first projecting roller, the first and second projecting rollers having different shapes in cross-section such that only the first projecting roller can extend into the second guide track portion.

Preferably one of the first and second projecting rollers has a width greater than that of the other and the other has a height greater than that of said one.

Preferably the forward most panel is free to slide over a limited range of movement.

Preferably the forward most panel includes an extension portion extending sideways into the guide track adjacent a front edge thereof for engagement into the guide track, the guide track having a slot shaped recess for receiving the extension portion.

Preferably the rearward most panel includes locking means for engaging at least one of the side cover elements for holding the cover top in extended position and at least one partially retracted position.

Preferably at least one partially retracted position is arranged such that those panels are in a folded position are wholly folded and those panels which are unfolded are wholly unfolded.

Preferably the cover elements stand upwardly from the container and wherein the guide tracks each include a horizontal portion and a downwardly and rearwardly inclined rear portion at a rear end of the horizontal portion.

Preferably the rear inclined portion is connected to the rear end of the first portion by hinge means allowing the rear portions to pivot about a common horizontal axis transverse to the container to raise the rear portion and the panels therein.

Preferably each guide track is mounted on a respective one of two sub panel portions each at a respective side cover element with each of the sub panel portions being pivotal relative to the respective side cover element with the rear portion of the guide track.

Preferably the rear portion receives two panels including the rearward most panel and the next adjacent panel.

Preferably at least one of the two panels includes a window.

Preferably the rearward most panel includes a lock system providing a pair of horizontally movable pins each for engageable into a respective one of the side cover elements.

Preferably the flexible hinge coupling comprises a flexible elastomeric strip having a forward edge attached to a rear edge of one panel and a rearward edge attached to a forward edge of the next panel.

Preferably the cover includes a housing for receiving the folded panels in the folded position thereof, the housing including a bottom wall underneath the folded cover panels.

Preferably the housing includes a top plate covering the folded panels.

Preferably the side portions each include a door panel allowing access to the housing.

According to a second aspect of the invention there is provided a cover for a container comprising:

a cover body-having a front cover element for connection to a front wall of the container and two side cover elements each for connection to a respective one of two side walls of the container, the front and side cover elements defining an open top;

and a cover top for extending across and covering the open top, the cover top comprising:

a plurality of cover panels each having two side edges, a front edge and a rear edge and each extending across the open top such that each side edge lies at a respective one of the side cover elements;

the cover panels being arranged in a row with the front edge of one panel adjacent the rear edge of the next panel with the row extending from a forward most panel to a rearward most panel;

a flexible hinged coupling between each panel and the next adjacent panel connecting the front edge of one panel to the rear edge of the next adjacent panel;

each side cover element having thereon a guide track cooperating with the respective side edges of the panels to allow sliding movement of the panels forwardly and rearwardly of the cover body;

wherein the cover elements stand upwardly from the container and wherein the guide tracks each include a horizontal portion and a downwardly and rearwardly inclined rear portion at a rear end of the horizontal portion;

wherein the rear inclined portion is connected to the rear end of the first portion by hinge means allowing the rear portions to pivot about a common horizontal axis transverse to the container to raise the rear portion and the panels therein; and wherein each guide track is mounted on a respective one of two sub panel portions each at a respective side cover element with each of the sub panel portions being pivotal relative to the respective side cover element with the rear portion of the guide track.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

The truck box cover is generally indicated at 10 and comprises a main cover body 11 and a plurality of sliding panels 12. The main cover body 11 comprises a first side element 13, a second side element 14 and a front element 15. The cover body 11 is shaped and arranged so that the sides 13 and 14 and the front 15 sit respectively on the two sides and front edge of a truck box. For this purpose, each of the front and side elements includes an inturned flange 18 which sits on a top wall 19 of the respective portion of the truck box. Thus the flange can be bolted or fastened to the side wall of the truck box to hold the main cover body in place.

The sides 13 and 14 are joined to the front element at front corners so as to form an integral structure with sufficient stiffness when attached to the truck box to remain fixed in place with vertical side walls of the side and front elements standing vertically upwardly from the top surface 19 of the truck box.

At the top of the side wall 20 of each of the sides 13 and 14 is provided a horizontal inturned wall 21 which lies parallel to the flange 18 and is spaced upwardly therefrom. The horizontal wall extends along the full length of the side and extends inwardly only over a few inches. At the inner edge of the horizontal wall is provided a further vertical wall 22 which stands upwardly from the horizontal wall and is parallel to the side wall 20. At the top of the vertical wall 22 is provided an inturned flange 23.

The front wall 15 includes vertical side wall portion 18A which smoothly curves as indicated at 18B into a horizontal cover panel 24 which joins at the sides with the flanges 23.

Thus the cover body defines an opening formed by the inside edges 23A of the flanges 23 and a rear edge 24A of the cover panel portion 24.

The side walls 20 of the sides 13 and 14 each contain an inspection panel 25 positioned just above the flange 18 and spaced just downwardly from the horizontal wall 21 and just rearwardly of the front wall 18A. The inspection opening 25 can be covered by a cover panel (not shown) which can be locked in place by a suitable fastening arrangement.

The front wall 18A includes a window 26 which allows viewing from the cab of the pickup truck into the cover.

At the rear end of each of the side elements 13 and 14 is provided a respective one of a pair of rear cover portions 28 and 29. Each of the rear cover portions 28 and 29 is shaped so that it has outside edges 28A, 28B, 28C and 28D which follow the shape of the walls 20, 21, 22 and 23 respectively of the respective side element. At the edge 28D and the rear edge of the flange 23 is provided a hinge 30, which connects the whole of the rear cover portion 28 to the flange 23 for pivotal movement about a horizontal axis across the rear of the cover and passing through both the hinges 30. In this way both of the rear cover panel portions 28 and 29 can be hinged so that the bottom edge of that cover panel portion moves upwardly and rearwardly.

In the closed position of the rear cover portions 28 and 29 as shown in the drawings, a bottom edge 28E sits on a top edge 19A of the tailgate.

Suitable sealing techniques are provided between the cover and the top edge of the truck box both at the sides, at the front and also at the rear panel portions.

Figure 5:
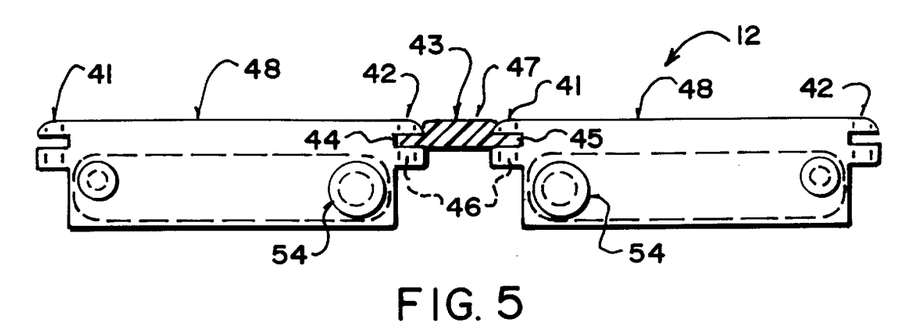
FIG. 5 is a view along the lines 5—5 of FIG. 1.
Figure 6:
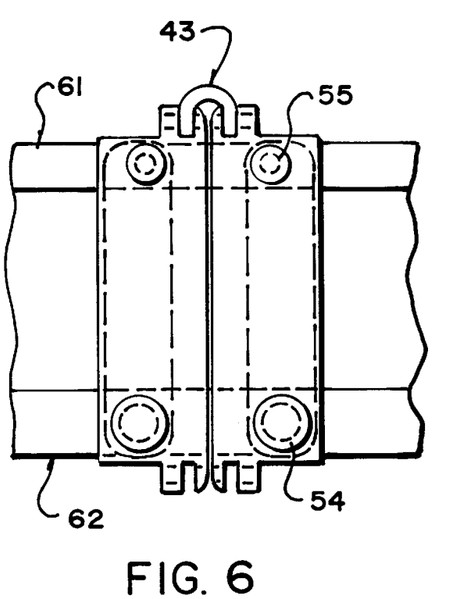
FIG. 6 is a similar view to that of FIG. 5 showing the panels in a folded position.

The panels 12 comprise a plurality of individual panels which are connected edge to edge with each panel extending across the full width of the opening to a position just beyond the edge 23A of the flange 23 so that side edges 40 of each panel just underlie the flange 23. The panels are coupled in a row as best shown in FIGS. 5 and 6. Thus each panel has a front edge 41 and a rear edge 42. The front edge 41 of one panel is connected to the rear edge 42 of the next adjacent panel by a flexible strip coupling 43 extending along the full length of the panels. A strip coupling includes a pair of flanges 44 and 45 which project forwardly and rearwardly respectively of the strip coupling and extend into slots defined at the front and rear edges of the panels. The couplings are then connected to the panels by rivets 46 which extend through the panel at the slot and through openings in the flexible coupling 43 so as to clamp the structure together. The flexible couplings have an upper surface 47 which is coincident with an upper surface 48 of each of the panels so that the upper surface runs against the undersurface of the flange 23 and defines a horizontal cover surface for the cover. One or both of the last two panels carries a window 100.

The panels are carried on a pair of guide tracks 50 and 51 each mounted on a respective side element of the cover body. Each guide track is suspended on the undersurface of the flange 23 so as to hang downwardly therefrom and so as to be carried thereby. Each guide track extends from a rear end 53 at the bottom of the rear portion of a cover to a forward end generally indicated at 54 at which is provided a folding system for the cover panels.

The panels 12 carry on their side edges 40 a pair of track followers 54 and 55. Each panel carries at each end two of the track followers one arranged adjacent a front and one arranged adjacent the rear edge. It will be noted from the figures that the track followers are of different dimensions. Each of the track followers comprises a roller 56 carried on a support shaft so that the roller can rotate about an axis extending across the cover. The track followers 54 have rollers which are of larger diameter and shorter axial length. The rollers of the track followers 55 are of longer axial length and reduced diameter.

Figure 1:
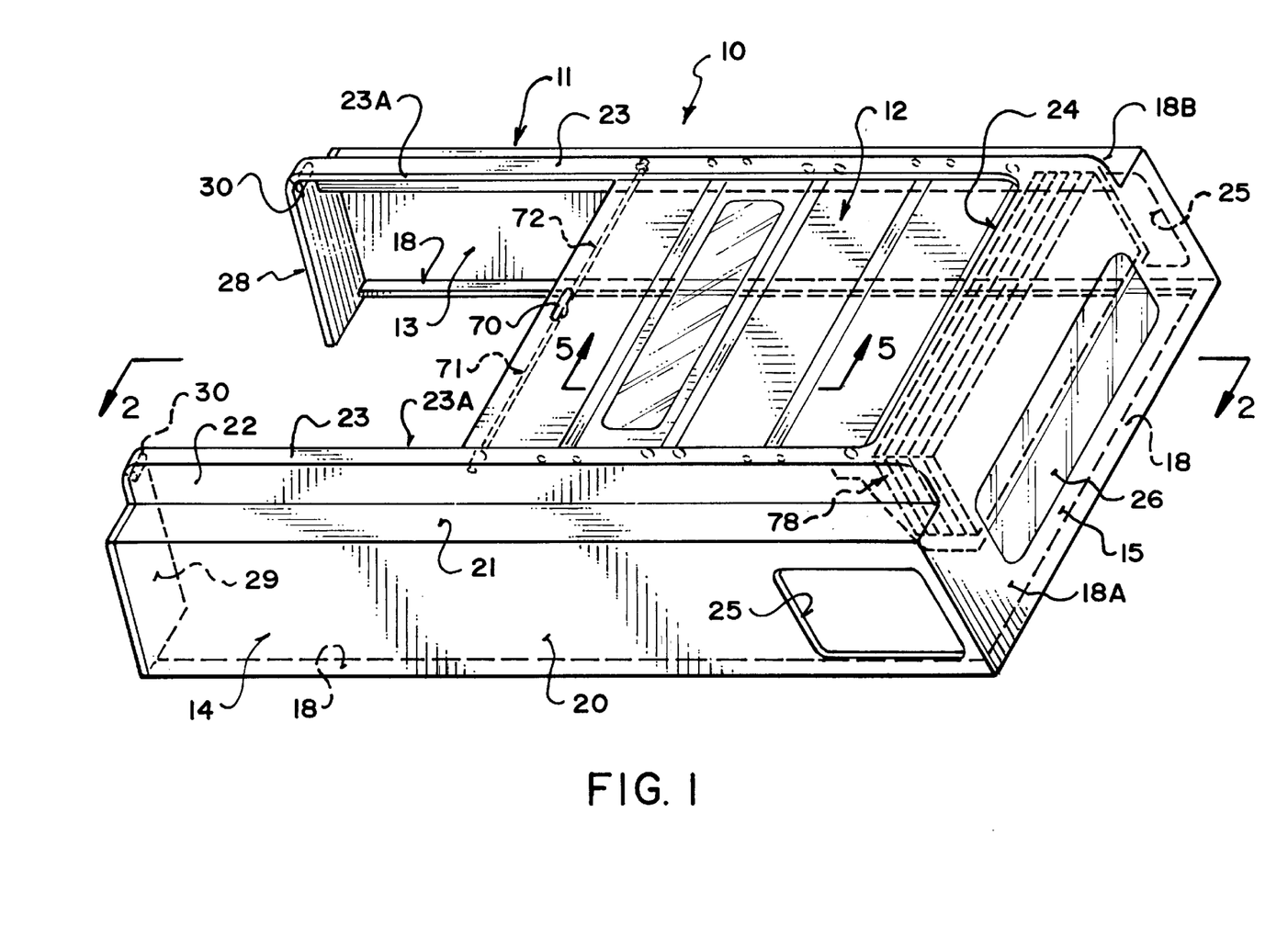
FIG. 1 is an isometric view of a truck box cover according to the present invention.
Figure 2:
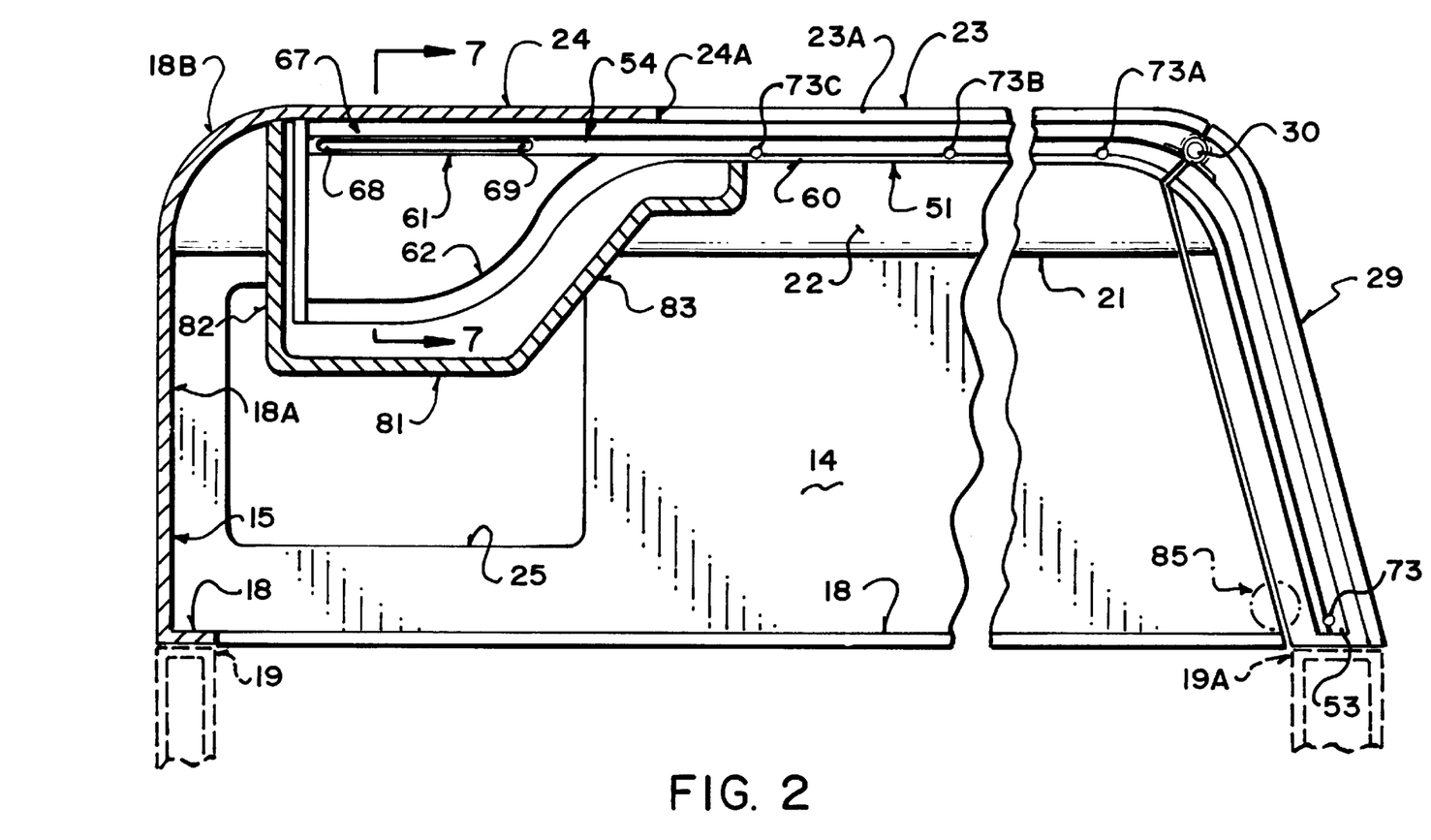
FIG. 2 is a longitudinal cross sectional view along the lines 2—2 of FIG. 1.
Figure 3:
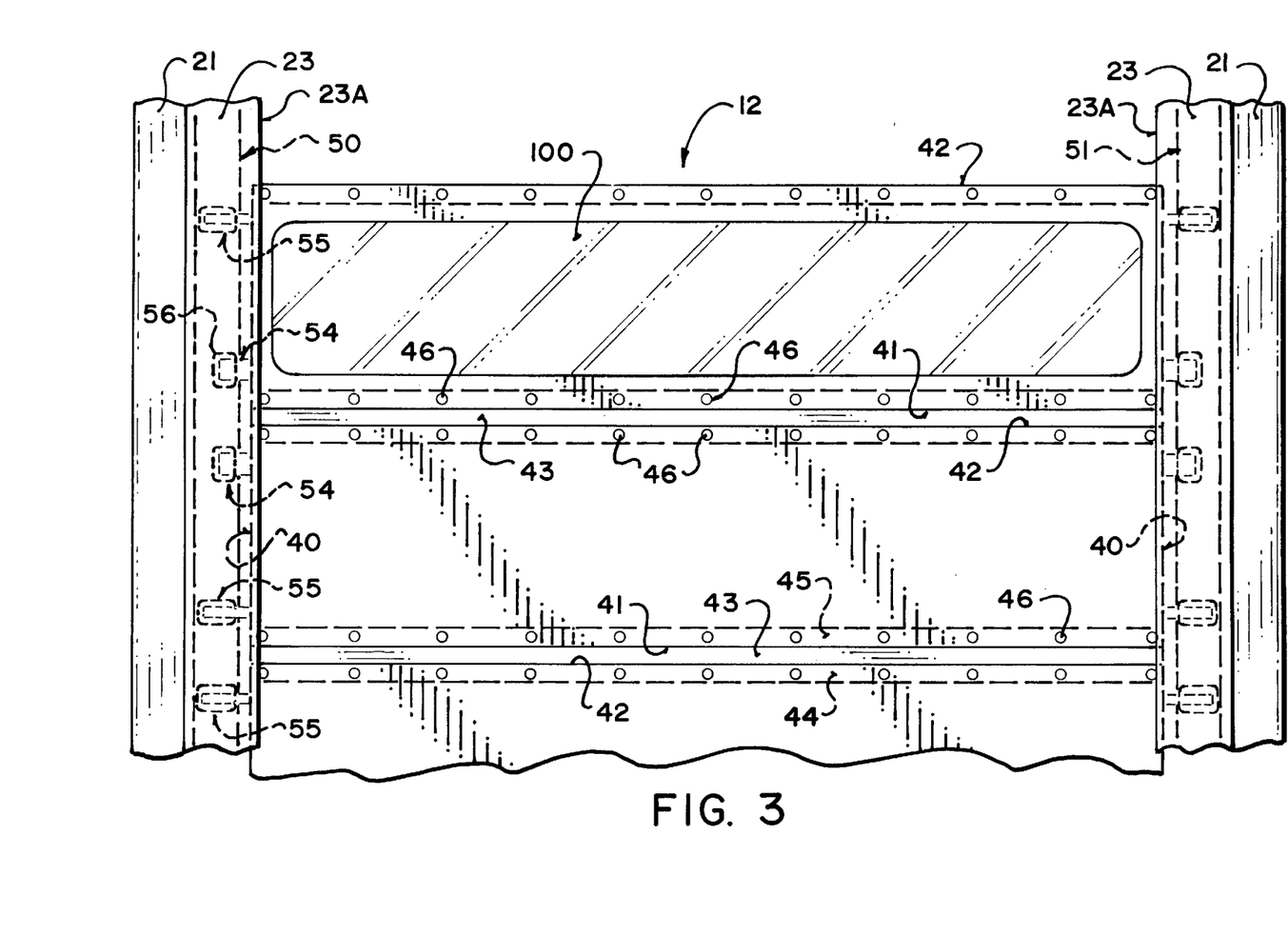
FIG. 3 is a top plan view of a portion of the cover of FIG. 1.
Figure 4:
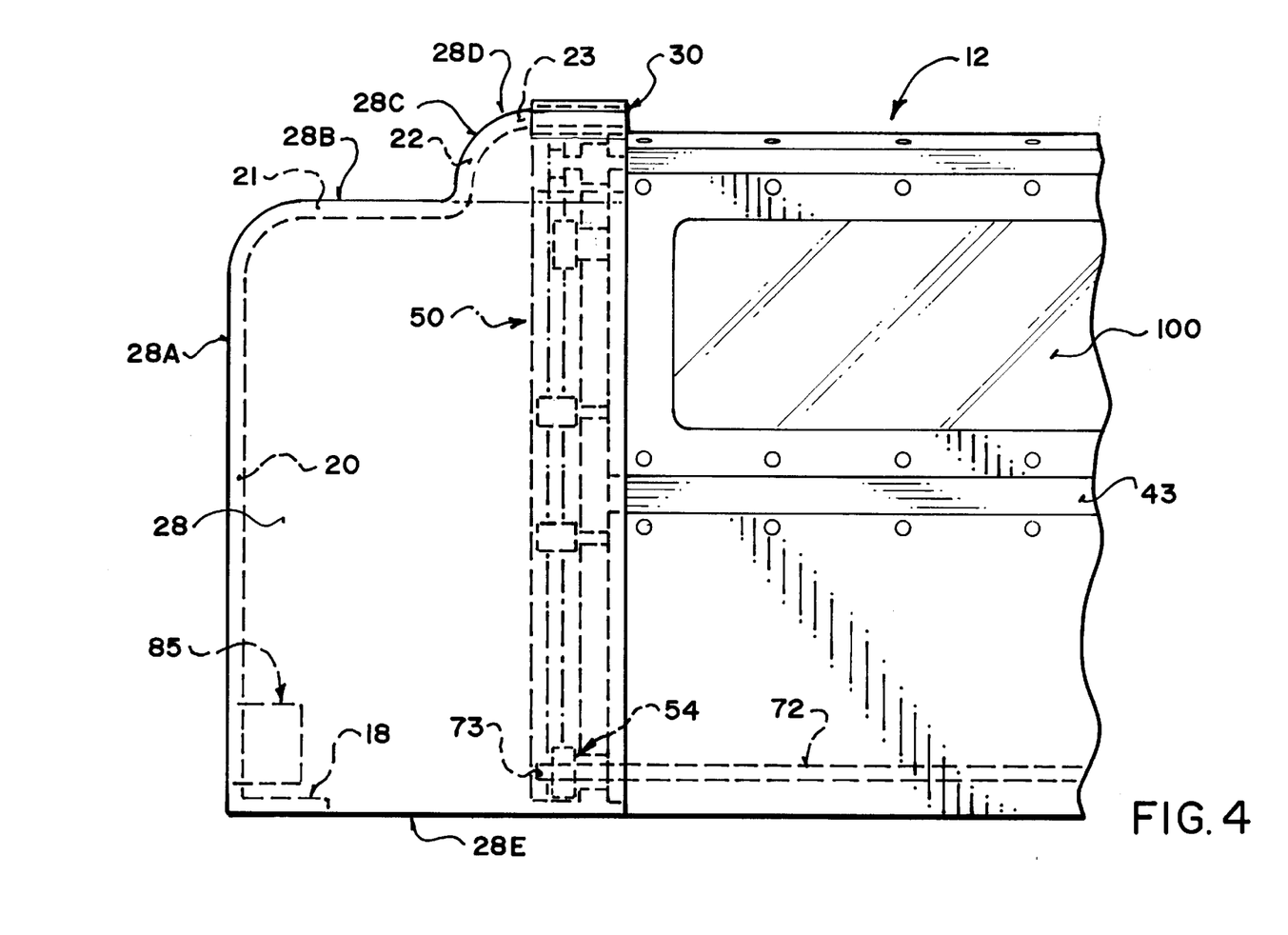
FIG. 4 is a rear elevational view of one side of the cover of FIG. 1 showing the cover in the closed position.

The panels are arranged so that the track followers 54 are arranged together at adjacent forward and rearward edges of two adjacent panels. The track followers 55 are then arranged so as to be closed together at the front and rear edges of the next adjacent junction as best shown in FIG. 3.

Figure 7:
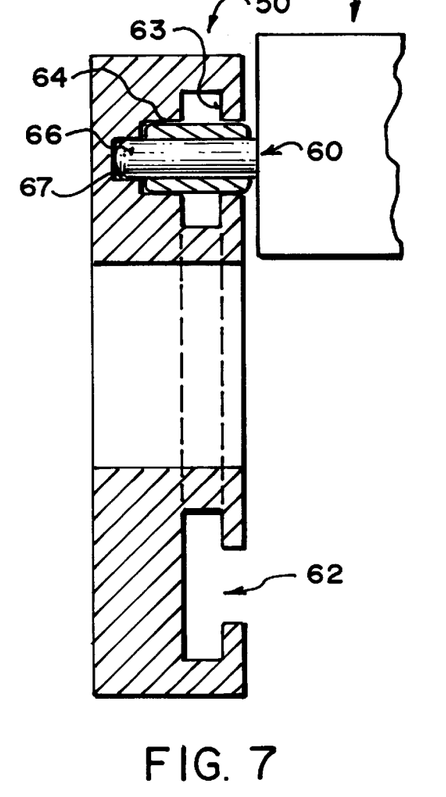
FIG. 7 is a view along the lines 7—7 of FIG. 2.

The guide track cross section is shown in FIG. 7. Along the majority of the length of the guide track there is provided a single guide track element 60. At the forward end the guide track divides into an upper guide track element 61 and a lower guide track element 62. Along the guide track element 60, the guide tracking cross section is shaped so as to receive both the rollers 54 and the rollers 55. Thus the guide track in cross section includes a first recess 63 shaped to receive the guide track elements 54 of larger diameter and a second recess 64 to receive the guide track elements 55 of longer axial length.

The guide track element 61 is shaped in cross section to receive only the track followers 55. The guide track element 62 is shaped to receive only the followers 54.

In the majority of the guide track, therefore, the panels are guided in sliding movement forwardly and rearwardly along the guide track with both the followers carried thereby. At the forward section 54, however, the track divides so that the followers 55 move along the upper portion and the followers 54 move along the lower portion thus causing the panels to move into a folded pattern similar to an accordion.

The forward most panel shown in FIG. 7 includes an additional pin 66 which extends through the forward most one of the track followers 55 with that pin engaging into a slot 67 having a forward end 68 and a rearward end 69. This slot acts to locate the panel cover so that it can slide forwardly and backwardly to the extent defined by the slot 67.

The rearward most panel includes a locking handle 70 operating a pair of transversely extending locking rods 71 and 72 each of which cooperates with a respective side of a cover body. Each rod 72 projects through the track follower 54 into a receptacle 73 in the rear portion 28 or 29. Thus the rearmost panel can be locked with its rearmost edge at the bottom of the rear portions 28 and 29. Further locking receptacles 73A, 73B and 73C are provided along the length of the track so that the rear most cover panel can be locked at any one of those four positions. The four positions are selected so that when the rear panel is locked at one of those positions, a whole number of panels is folded in the accordion manner as indicated at 78 and a whole number of panels remain unfolded so that they lie flat in the horizontal track portion 60. In this way beyond the rear edge 24A, the panels remain in horizontal condition and the panel which lies adjacent the edge 24A has not yet commenced the folding action.

The front section 54 of the track is formed within a housing 80 including a bottom wall 81, a front wall 82 and an inclined wall at the rear indicated at 83. These walls lie underneath the cover panel 24 so as to form a housing containing the folded section 78 of the panels. The housing can be accessed by opening one or both of the cover panels over the openings 25.

In operation, the panels are initially moved to the fully closed position and the locking handle operated to actuate the rods to lock the rear most panel in the receptacle 73. This action locks the rearmost panel at the bottom of the rear portions 28 and 29. The dimensions of the panels are selected relative to the dimensions of the rear portions so that two panels lie in the rear portion and the junction between the penultimate panel and the next adjacent panel lies immediately adjacent the hinge 30. Thus with the panels fully closed, the rear portions 28 and 29 and the two last panels can be opened by pivotal movement about the hinge 30 and by pivotal movement about the coupling 43 immediately adjacent the hinge 30. In order to hold the portion 28 and 29 in a closed position, there is provided a locking mechanism schematically indicted at 85. The locking mechanism cooperates between the outside edge of the rear portion 28, 29 and the adjacent side wall of the side element.

In this way with the cover panels fully closed, a rear section of the cover can be opened manually simply to gain access to the rear part of the truck box.

In this rear most locked position, the forward most panel has its front track follower moved to the rear end 69 of the slot 67. When it is desired to open the cover panels, the lock handle 70 is actuated to release the lock rods 71 and 72 from the receptacles 73. The panel can then be pushed forwardly so that the forward most panel slides forwardly in the slot until the rear track follower of the forward most panel engages into the track portion 62 causing that rear edge to fold downwardly. At the same time the forward edge of the next adjacent panel also folds downwardly to form the first accordion fold. If further opening movement is required, the panels are again pushed forwardly and the rear edge of the second panel follows the upper track portion 61 and is followed by the front edge of the third panel. This pattern continues to form the accordion folds 78 until all of the cover is stored in this manner or until a required portion of the cover is stored leaving a number of the panels exposed in the horizontal condition to be locked by engagement of the lock rods into the cited one of the receptacles 73A, 73B, and 73C.

The cover thus provides a simple arrangement which can be conveniently stored without interfering with a significant portion of the truck box. The cover is rigid and can be readily manipulated to various part opened conditions for convenient operation.

It is one feature of the present invention that the tracks are concealed or protected underneath the cover side so that foreign material such as dirt and ice do not accumulate within the tracks to affect the proper operation.

While the above description relates to a construction for use as a truck box, the same arrangement can be used for other applications such as the roof of a van, minivan or other similar vehicle or for the cover or roof of any other container such as a greenhouse.

In an alternative arrangement (not shown) the panels may extend downwards to a position beyond the top edge of the truck box and thus replace the truck tailgate with the panels having a locking device at the box floor. An additional track structure may be provided on each side for attachment to the sides of the truck box for supporting and guiding the panels.

The structure can be located effectively at the height of the top of the truck box so that the height of the sides is very low thus mounting the sliding cover substantially at the height of the top of the truck box. This construction is possible since the cover and the operating elements of the cover are all mounted inwardly of the truck box sides.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A folding cover for a container comprising:
    a cover body having a front cover element for connection to a front wall of the container and two side cover elements each for connection to a respective one of two side walls of the container, the front and side cover elements defining an open top;
    and a cover top for extending across and covering the open top, the cover top comprising:
    a plurality of cover panels each having two side edges, a front edge and a rear edge and each extending across the open top such that each side edge lies at a respective one of the side cover elements;
    the cover panels being arranged in a row with the front edge of one panel adjacent the rear edge of the next panel with the row extending from a forward most panel to a rearward most panel;
    a flexible hinged coupling between each panel and the next adjacent panel connecting the front edge of one panel to the rear edge of the next adjacent panel;
    each side cover element having thereon a guide track cooperating with the respective side edges of the panels to allow sliding movement of the panels forwardly and rearwardly of the cover body;
    the guide tracks being arranged such that, as the panels are moved forwardly, a rear edge of said forward most or first panel and connected front edge of a second panel are folded to face downwardly while a rear edge of the second panel and the connected front edge of a third panel are folded to face upwardly so that the panels are folded in accordion manner at a forward end of the container.

2. The cover according to claim 1 wherein each guide track has a main track portion along the side cover elements, a first guide track portion for guiding the upwardly facing edges and a second guide track portion for guiding the downwardly facing edges.

3. The cover according to claim 2 wherein the first guide track portion lies along a common line with the main track portion such that the upwardly facing edges lie substantially in a common plane with a remainder of the cover panels and the second guide track portion extends downwardly from the first guide track portion.

4. The cover according to claim 3 wherein at least one of the rear edge of the first panel and the front edge of the second panel carries a first projecting roller for engaging the second guide track portion and at least one of the rear edge of the second panel and the front edge of the third panel carries a second projecting roller for engaging the first guide track portion, the main track portion being shaped in cross-section to receive both the first and second projecting rollers, the first guide track portion being shaped in cross-section to receive only the second projecting roller and the second guide track portion being shaped to receive only the first projecting roller, the first and second projecting rollers having different shapes in cross-section such that only the first projecting roller can extend into the second guide track portion.

5. The cover according to claim 4 wherein one of the first and second projecting rollers has a width greater than that of the other and the other has a height greater than that of said one.

6. The cover according to claim 1 wherein the forward most panel is free to slide over a limited range of movement.

7. The cover according to claim 6 wherein the forward most panel includes an extension portion extending sideways into the guide track adjacent a front edge thereof for engagement into the guide track, the guide track having a slot shaped recess for receiving the extension portion.

8. The cover according to claim 1 wherein the rearward most panel includes locking means for engaging at least one of the side cover elements for holding the cover top in extended position and at least one partially retracted position.

9. The cover according to claim 8 wherein the at least one partially retracted position is arranged such that those panels that are in a folded position are wholly folded and those panels which are unfolded are wholly unfolded.

10. The cover according to claim 1 wherein the cover elements stand upwardly from the container and wherein the guide tracks each include a horizontal portion and a downwardly and rearwardly inclined rear portion at a rear end of the horizontal portion.

11. The cover according to claim 10 wherein the rear inclined portion is connected to the rear end of the first portion by hinge means allowing the rear portions to pivot about a common horizontal axis transverse to the container to raise the rear portion and the panels therein.

12. The cover according to claim 11 wherein each guide track is mounted on a respective one of two sub panel portions each at a respective side cover element with each of the sub panel portions being pivotal relative to the respective side cover element with the rear portion of the guide track.

13. The cover according to claim 10 wherein the rear portion receives two panels including the rearward most panel and the next adjacent panel.

14. The cover according to claim 13 wherein at least one of the two panels includes a window.

15. The cover according to claim 10 wherein the rearward most panel includes a lock system providing a pair of horizontally movable pins each for engageable into a respective one of the side cover elements.

16. The cover according to claim 1 wherein the flexible hinge coupling comprises a flexible elastomeric strip having a forward edge attached to a rear edge of one panel and a rearward edge attached to a forward edge of the next panel.

17. The cover according to claim 1 including a housing for receiving the folded panels in the folded position thereof, the housing including a bottom wall underneath the folded cover panels.

18. The cover according to claim 17 wherein the housing includes a top plate covering the folded panels.

19. The cover according to claim 1 wherein the side portions each include a door panel allowing access to the housing.

20. A cover for a container comprising:

a cover body having a front cover element for connection to a front wall of the container and two side cover elements each for connection to a respective one of two side walls of the container, the front and side cover elements defining an open top;

and a cover top for extending across and covering the open top, the cover top comprising:

a plurality of cover panels each having two side edges, a front edge and a rear edge and each extending across the open top such that each side edge lies at a respective one of the side cover elements;

the cover panels being arranged in a row with the front edge of one panel adjacent the rear edge of the next panel with the row extending from a forward most panel to a rearward most panel;

a flexible hinged coupling between each panel and the next adjacent panel connecting the front edge of one panel to the rear edge of the next adjacent panel;

each side cover element having thereon a guide track cooperating with the respective side edges of the panels to allow sliding movement of the panels forwardly and rearwardly of the cover body;

wherein the cover elements stand upwardly from the container and wherein the guide tracks each include a horizontal portion and a downwardly and rearwardly inclined rear portion at a rear end of the horizontal portion;

wherein the rear inclined portion is connected to the rear end of the first portion by hinge means allowing the rear portions to pivot about a common horizontal axis transverse to the container to raise the rear portion and the panels therein; and wherein each guide track Is mounted on a respective one of two sub panel portions each adjacent to a respective side cover element with each of the sub panel portions being pivotal relative to the respective side cover element with the rear portion of the guide track.

* * * * *